(12) United States Patent
Hong et al.

(10) Patent No.: US 6,643,412 B1
(45) Date of Patent: Nov. 4, 2003

(54) METHOD AND APPARATUS FOR HIGH SPEED CONVOLUTION

(75) Inventors: Cheol-Kee Hong, Songnam (KR); Cheol-Woo Kim, Songnam (KR)

(73) Assignee: LG Electronics, Inc., Seoul (KR)

(*) Notice: Subject to any disclaimer, the term of this patent is extended or adjusted under 35 U.S.C. 154(b) by 0 days.

(21) Appl. No.: 09/413,490

(22) Filed: Oct. 6, 1999

(30) Foreign Application Priority Data

Jun. 30, 1999 (KR) .................................. 1999-25717

(51) Int. Cl.[7] ............................................. G06K 9/64
(52) U.S. Cl. ...................................... 382/279; 708/420
(58) Field of Search .......................... 382/279; 708/420, 708/445; 345/615

(56) References Cited

U.S. PATENT DOCUMENTS

| | | | | |
|---|---|---|---|---|
| 5,151,953 A | * | 9/1992 | Landeta | 382/41 |
| 5,948,053 A | * | 9/1999 | Kamiya | 708/522 |
| 6,215,908 B1 | * | 4/2001 | Pazmino et al. | 382/240 |

* cited by examiner

*Primary Examiner*—Yon J. Couso
(74) *Attorney, Agent, or Firm*—Jacobson Holman PLLC

(57) ABSTRACT

The method for high speed convolution includes the steps of: determining a convolution mask by dividing a theoretical mask into a predetermined number of areas as many as a multiple of sampling intervals of target data; generating accumulative image data of a target image to be convolved and storing them in a memory; calculating image summation data in an area corresponding to the area of each step of the mask from the accumulative image data; and calculating the convolution of pixels from the corresponding area image data and mask step values corresponding to the area.

5 Claims, 9 Drawing Sheets

| 1 | 1 | 1 | 1 | 1 |
|---|---|---|---|---|
| 1 | 1 | 1 | 1 | 1 |
| 1 | 1 | 1 | 1 | 1 |
| 1 | 1 | 1 | 1 | 1 |
| 1 | 1 | 1 | 1 | 1 |

[7a] → summation image

| 1 | 2 | 3 | 4 | 5 |
|---|---|---|---|---|
| 2 | 4 | 6 | 8 | 10 |
| 3 | 6 | 9 | 12 | 15 |
| 4 | 8 | 12 | 16 | 20 |
| 5 | 10 | 15 | 20 | 25 |

| 1 | 2 | 3 | 4 | 5 |
|---|---|---|---|---|
| 2 | 4 | 6 | 8 | 10 |
| 3 | 6 | 9 | 12 | 15 |
| 4 | 8 | 12 | 16 | 20 |
| 5 | 10 | 15 | 20 | 25 |

[7b] → summation image

| 1 | 3 | 6 | 10 | 15 |
|---|---|---|---|---|
| 3 | 9 | 18 | 30 | 45 |
| 6 | 18 | 36 | 60 | 90 |
| 10 | 30 | 60 | 100 | 150 |
| 15 | 45 | 90 | 150 | 225 |

[Fig. 8a]

| 1 | 2 | 3 | 4 | 5 |
|---|---|---|---|---|
| 2 | 4 | 6 | 8 | 10 |
| 3 | 6 | 9 | 12 | 15 |
| 4 | 8 | 12 | 16 | 20 |
| 5 | 10 | 15 | 20 | 25 |

[Fig. 8b]

| 1 | 3 | 6 | 10 | 15 |
|---|---|---|---|---|
| 3 | 9 | 18 | 30 | 45 |
| 6 | 18 | 36 | 60 | 90 |
| 10 | 30 | 60 | 100 | 150 |
| 15 | 45 | 90 | 150 | 225 |

[Fig. 8c]

| 1 | 1 | 1 |
|---|---|---|
| 1 | 3 | 1 |
| 1 | 1 | 1 |

[Fig. 8d]

| 1 | 1 | 1 |
|---|---|---|
| 1 | 1 | 1 |
| 1 | 1 | 1 |

+

|   |   |   |
|---|---|---|
|   | 2 |   |
|   |   |   |

[Fig. 8e]

| 4X1 | 6X1 | 8X1 |
|---|---|---|
| 6X1 | 9X3 | 12X1 |
| 8X1 | 12X1 | 16X1 |

[Fig. 8f]

| 4X1 | 6X1 | 8X1 |
|---|---|---|
| 6X1 | 9X1 | 12X1 |
| 8X1 | 12X1 | 16X1 |

+

| | | |
|---|---|---|
| | 9X2 | |
| | | |

| 128 | 132 | 129 | 128 | 131 | 132 | 131 | 128 | 132 | 128 | 128 | 131 |
|---|---|---|---|---|---|---|---|---|---|---|---|
| 132 | 132 | 129 | 131 | 128 | 129 | 130 | 129 | 128 | 132 | 131 | 131 |
| 130 | 128 | 129 | 130 | 130 | 129 | 130 | 131 | 131 | 132 | 129 | 129 |
| 130 | 131 | 132 | 132 | 131 | 131 | 134 | 130 | 128 | 130 | 128 | 131 |
| 131 | 129 | 131 | 133 | 133 | 135 | 131 | 132 | 132 | 130 | 128 | 130 |
| 132 | 132 | 131 | 132 | 135 | 135 | 133 | 133 | 132 | 129 | 130 | 128 |
| 132 | 130 | 131 | 131 | 133 | 135 | 134 | 134 | 133 | 129 | 132 | 129 |
| 130 | 131 | 129 | 132 | 131 | 135 | 135 | 131 | 128 | 130 | 132 | 131 |
| 129 | 131 | 130 | 129 | 131 | 132 | 131 | 130 | 130 | 129 | 130 | 132 |
| 132 | 129 | 129 | 131 | 129 | 132 | 132 | 129 | 129 | 132 | 128 | 131 |
| 132 | 130 | 131 | 128 | 132 | 132 | 131 | 129 | 128 | 129 | 129 | 131 |
| 128 | 129 | 130 | 131 | 131 | 130 | 131 | 132 | 131 | 128 | 128 | 129 |

[Fig. 10b]

| 82 | 68 | 54 | 47 | 49 | 58 | 67 | 71 | 73 | 75 | 78 | 92 |
|---|---|---|---|---|---|---|---|---|---|---|---|
| 87 | 66 | 45 | 31 | 30 | 36 | 45 | 53 | 64 | 76 | 84 | 94 |
| 73 | 60 | 51 | 49 | 50 | 55 | 58 | 59 | 61 | 64 | 69 | 79 |
| 63 | 65 | 77 | 99 | 117 | 122 | 113 | 91 | 66 | 46 | 43 | 58 |
| 81 | 84 | 105 | 146 | 188 | 204 | 184 | 140 | 87 | 45 | 33 | 52 |
| 106 | 96 | 107 | 155 | 219 | 255 | 237 | 180 | 111 | 62 | 50 | 68 |
| 110 | 85 | 80 | 123 | 197 | 250 | 241 | 178 | 110 | 74 | 76 | 91 |
| 98 | 63 | 45 | 74 | 143 | 200 | 192 | 131 | 76 | 67 | 91 | 107 |
| 90 | 52 | 26 | 40 | 93 | 139 | 130 | 76 | 37 | 49 | 89 | 112 |
| 86 | 53 | 29 | 36 | 75 | 109 | 98 | 52 | 21 | 32 | 69 | 99 |
| 70 | 54 | 46 | 58 | 88 | 114 | 107 | 67 | 28 | 19 | 42 | 72 |
| 56 | 55 | 67 | 86 | 109 | 131 | 129 | 92 | 43 | 18 | 29 | 53 |

[Fig. 10c]

| 81 | 68 | 56 | 37 | 55 | 69 | 63 | 68 | 77 | 68 | 77 | 96 |
|---|---|---|---|---|---|---|---|---|---|---|---|
| 92 | 57 | 35 | 25 | 34 | 48 | 48 | 58 | 60 | 72 | 77 | 92 |
| 74 | 59 | 56 | 51 | 52 | 55 | 64 | 65 | 55 | 54 | 73 | 64 |
| 55 | 67 | 77 | 101 | 118 | 124 | 124 | 95 | 69 | 42 | 44 | 62 |
| 88 | 88 | 109 | 149 | 194 | 215 | 187 | 143 | 90 | 43 | 36 | 62 |
| 112 | 102 | 102 | 159 | 235 | 254 | 235 | 187 | 126 | 71 | 42 | 73 |
| 117 | 88 | 87 | 126 | 205 | 255 | 249 | 185 | 107 | 77 | 77 | 91 |
| 96 | 66 | 51 | 83 | 145 | 205 | 206 | 139 | 69 | 72 | 96 | 109 |
| 81 | 48 | 36 | 40 | 107 | 145 | 137 | 79 | 40 | 43 | 91 | 112 |
| 87 | 52 | 21 | 42 | 75 | 118 | 99 | 47 | 18 | 30 | 61 | 88 |
| 67 | 55 | 39 | 49 | 95 | 117 | 105 | 68 | 28 | 17 | 45 | 61 |
| 60 | 65 | 60 | 89 | 120 | 129 | 123 | 99 | 42 | 14 | 34 | 54 |

METHOD AND APPARATUS FOR HIGH SPEED CONVOLUTION

BACKGROUND OF THE INVENTION

1. Field of the Invention

The present invention relates generally to convolution for examination using an image device and, more particularly, to a method and apparatus for high speed convolution designed to process high speed convolution irrespective of a mask size through a novel image file structure a linearity of the convolution and overcome problems with the related art convolution processing that cannot be actually realized due to an excessive processing time though examination reliability is enhanced with an increase in the mask size for the convolution.

2. Discussion of Related Art

In an image processing, convolution refers to a procedure of operation to obtain corresponding pixel values by multiplying the values of pixels surrounding image data in an area such as a kernel area by kernel values and summing the resulting values, in a case where the kernel center is matched to each pixel of the image data through an operation of a kernel composed of numerals and the image data.

When the individual pixel value of image data is I(x,y), the mask size (2m+1)×(2n+1) and the mask value M(x,y), the resulting value of operation for each pixel can be expressed by:

$$\sum(x, y) = \sum_{i=-m}^{i=m} \sum_{j=-n}^{j=n} I(x+i, y+j) \times M(i+m+l, j+n+l)$$

Here, the index of the image data out of a range is zero and that of the mask value M(l,j) is positive.

Figure 1:
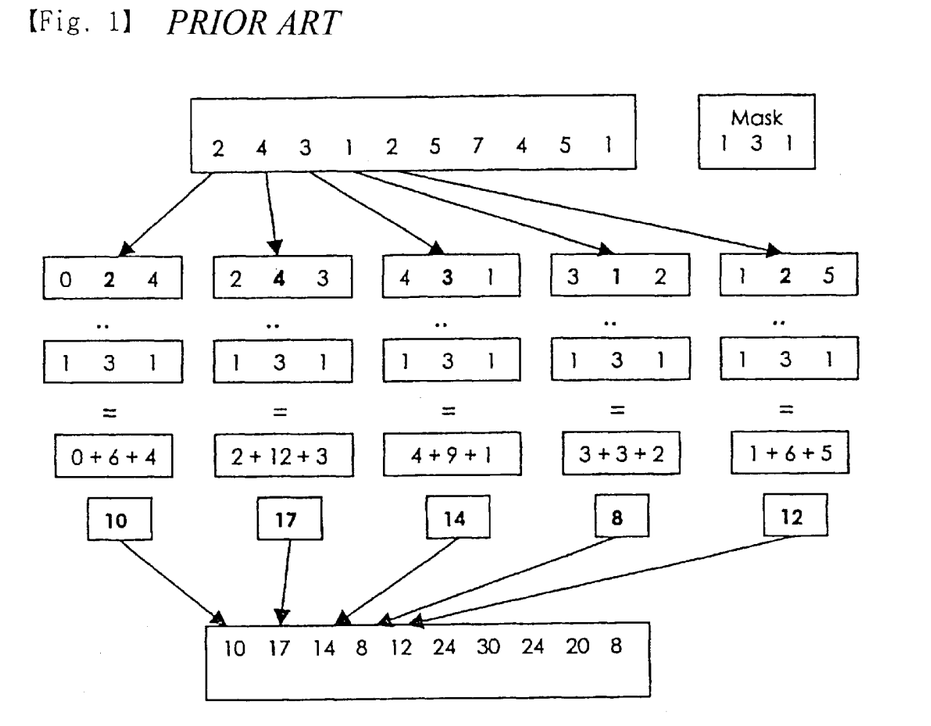
FIG. 1 is a diagram illustrating an example of a one-dimensional convolution according to prior art.

FIG. 1 shows a one-dimenisional example of the calculation procedure.

A filter is generally used in the examination process through image processing and there are some cases where quality of output images is changed according to the mask size. When the mask size is increased, the image data is insensitive to the noise component and the user has many values to control so that more accurate values can be obtained. However, there is a need of multiplication and summation for the individual pixels as many as the mask size in the operation procedure. Therefore, the operation procedure takes more time with an increase in the mask size. This results in limitation of the mask size in actual applications.

As well known, the convolution procedure is to obtain the resulting value of the individual pixel by multiplying the values corresponding to the pixels and summing the multiplication results. However, this procedure involves a problem in that the number of calculations rapidly increases with an increase in the size of the filter. To solve the problem, there have been suggested many inventions in which the two-dimensional mask is divided into one-dimensional ones, or the calculations are performed in real tine by use of a high speed hardware.

For the related art method using the hardware, U.S. Pat. No 5,119,444 discloses Laplacian and Gaussian simulations using the hardware. Here, a simplest Laplacian filter and three binomial filters are sequentially used to constitute the hardware for 7×7 Gaussi an simulation.

Figure 2:
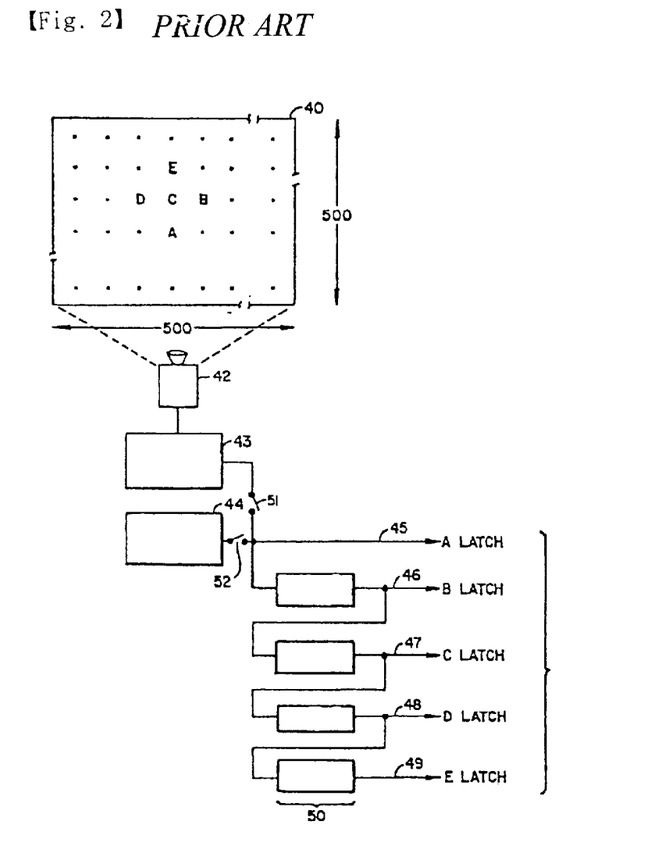
FIG. 2 is a diagram illustrating an example of an apparatus for storing in a storage medium image values of a target pixel and its surrounding pixels in image acquisition by means of a delay according to the prior art.

FIG. 2 shows that use is made of a delay to store a target pixel value and its surrounding pixel values during image acquisition according to prior art. Here, the reference numeral 42 represents an SEM for image acquisition, the reference numeral 43 an analog/digital converter for converting an analog video signal to its corresponding digital image data, the reference numeral 44 a pattern compensator for outputting pattern compensation data. The reference numerals 51 and 52 indicate switches, the reference numeral 50 a delay, and the reference numerals 45 and 49 output lines for storing, in a latch, image data obtained by combining signals via the switches 51 and 52 and signals via a plurality of delays.

Figure 3:
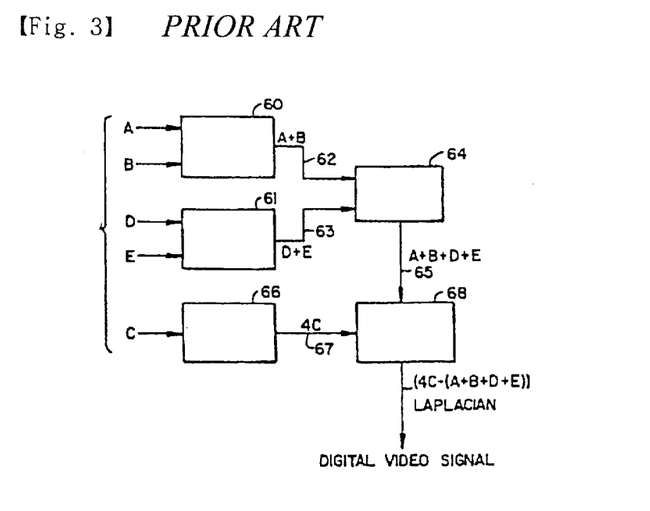
FIG. 3 is a diagram illustrating a procedure of obtaining Laplacian from five image values using summation circuits and a multiplication circuit according to the prior art.

FIG. 3 is a diagram illustrating a procedure of obtaining Laplacian in a manner of hardware, in which the Laplacian is obtained by summing image values of pixels surrounding a target pixel out of five image values acquired in FIG. 2 via summation circuits 60, 61 and 64, multiplying at a shifter the image value of the target pixel except for the four images values summed at the summation circuits 60 and 61, and subtracting at a subtractor 68 one of the two values obtained from the shifter 60 from the other value.

Figure 4:
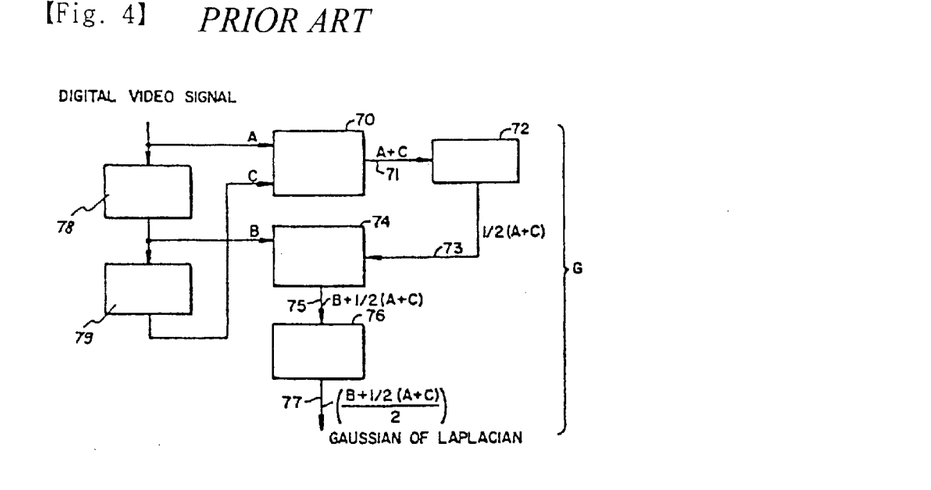
FIG. 4 is a diagram illustrating a procedure of obtaining one-dimensional Gaussian by using delays to obtain necessary data and using summation circuits and shifters according to the prior art.

FIG. 4 is a diagram illustrating a procedure of obtaining Gaussian in a manner of hardware, in which the one-dimensional Gaussian is obtained by delaying the digital video sign cals obtained in FIG. 3 via delays 78 and 79 and then using summation circuits 70 and 74 and shifters 72 and 77.

Figure 5:
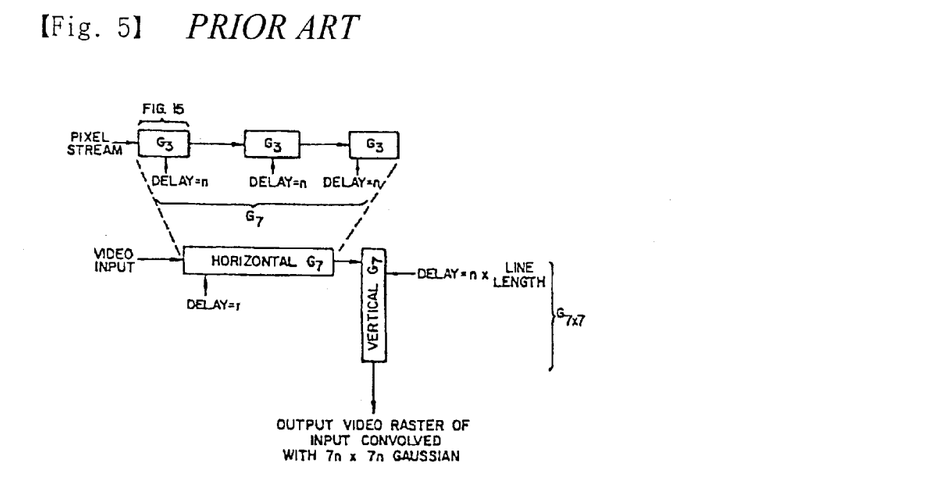
FIG. 5 is a diagram illustrating a procedure of obtaining 7n×7n Gaussian using the apparatus shown in FIG. 4.

FIG. 5 is a diagram illustrating a procedure of obtaining 7n×7n Gaussian using the circuit shown in FIG. 4 in a manner of hardware.

However these related art convolution apparatuses has a disadvantage in that their speed depends on the structure of a hardware and is not easy to change and that a variety of filters are difficult to realize.

Further, in a case where it is needed to increase the filter mask size in order to enhance the quality of results in a real-time calculation, the speed of the hardware is deteriorated or the cost is greatly increased.

SUMMARY OF THE INVENTION

It is therefore an object of the present invention to provide a method and apparatus for high speed convolution, designed to process high speed convolution irrespective of a mask size through a novel image file structure and linearity of the convolution and overcome problems with the related art convolution processing method and apparatus that cannot be actually realized due to an excessive processing time though examination reliability is enhanced with an increase in the mask size for the convolution.

To achieve the first object of the present invention, there is provided a method for high speed convolution including the steps of: determining a convolution mask by dividing a theoretical mask into a predetermined number of areas as many as a multiple of sampling intervals of target data; generating accumulative image data of a target image to be convolved and storing them in a memory; calculating image summation data in an area corresponding to the area of each step of the mask from the accumulative image data; and calculating the convolution of pixels from the corresponding area image data and mask step values corresponding to the area.

The present invention also provides an apparatus for high speed convolution including an accumulative image data generator for converting an input image of a camera to digital image data, adding the converted image data to image summation data from an origin on the present horizontal line to a previous pixel, and adding the result value to a pixel value in a rectangular area formed by an origin and pixels on the line previous to a present pixel, to generate an accumulative image data; a corresponding area data calculator for extracting a predetermined number of partial area data from the accumulative image data generated from the accumulative image data generator, selectively adding and subtracting the extracted partial area data to obtain image summation data of the corresponding area, and outputting a mask step value corresponding to the area; and a pixel convolution value output for multiplying the corresponding area image data obtained from the corresponding area data calculator by the corresponding mask step value and summing the multiplication results to output a pixel convolution value.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings:

In the drawings:

FIG. 6 is a diagram illustrating digitalization of a convolution mask, in which FIG. 6a shows an example of digitalization of a convolution mask according to the prior art and FIG. 6b shows an example of digitalization of a convolution mask according to the present invention;

FIGS. 8a–8h are diagrams illustrating procedures of calculating two-dimensional data in the related art convolution procedure and the present invention convolution procedure, in which:

FIG. 10 is a diagram illustrating an example of Laplacian of Gaussiall, in which FIG. 10a shows the original image value, FIG. 10b a convolution value obtained by the related art convolution method, FIG. 10c a convolution value obtained by the present invention convolution method.

DETAILED DESCRIPTION OF PREFERRED EMBODIMENT

Hereinafter, the present invention will be described in detail with reference to the accompanying drawings.

Figure 6:
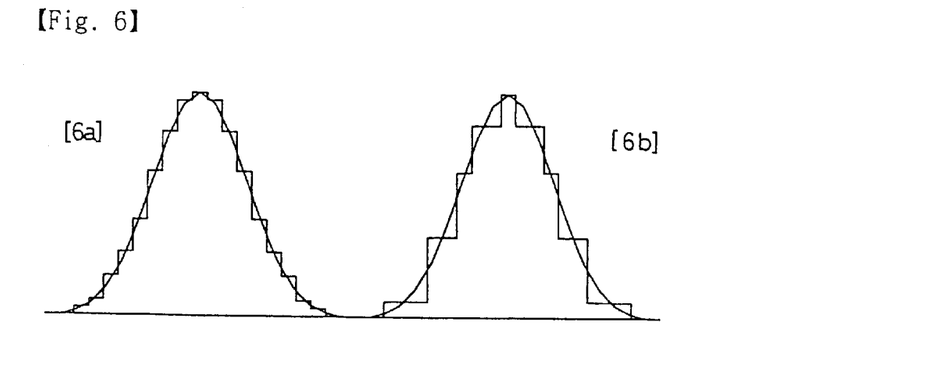

FIG. 6 is a diagram illustrating a procedure of simplifying a convolution mask as a part of the present invention method for high speed convolution, that is, a procedure of digitalizing the convolution mask.

In FIG. 6a, the convolution mask is digitalized according to the prior art in which an operation is performed using a mask sampled with the same sampling interval of the target data as a theoretical mask.

The present invention, as illustrated in FIG. 6b, divides the theoretical mask into areas as many as a multiple of the sampling interval of the target data. Here, the step number of the mask is equal to or smaller than that in the prior art method.

For a two-dimensional mask, the symmetrical mask values are changed to form a pyramid as a stack of steps in the rectangular form. This is because the number of calculations can be reduced when the areas for multiplication of filter mask values have rectangular form in application of accumulative image data.

Now, the accumulative image data for the targe image will be described in detail. The accumulative image data include the starting point of an image and summations of the brightness values of pixels present in the rectangular area formed by the present pixels. The accumulative image data can be expressed by:

$f(x,y)$=original image data $$F_x(x, y) = \sum_{i=1}^{x} f(i, y) = x - dir \cdot F_x(x-1, y) + f(x, y)$$

$$F_y(x, y) = \sum_{j=1}^{y} f(x, j) = y - dir \cdot F_y(x, y-1) + f(x, y)$$

$F_{xy}$ (x,y)=Summation of Gray Level from (1,1) to (x,y)

$F_{xy}(x, y)$ = Summation of Gray Level from $(1, 1)$ to $(x, y)$ =

$$\sum_{i=1}^{x} \sum_{j=1}^{y} f(i, j) = F_{xy}(x-1, y-1) + F_x(x, y) + F_y(x, y) - f(x, y) =$$

$$F_{xy}(x, y-1) + F_x(x, y) - F_{xy}(x-1, y) +$$

$$F_y(x, y) - F_{xy}(x, y-1) + F_s(x-1, y) + F(x, y) =$$

$$\sum_{i=x1}^{x2} \sum_{j=y1}^{y2} f(i, j) = F_{xy}(x2, y2) - F_{xy}(x2, y1) - F_{xy}(x1, y2) + F_{xy}$$

Figure 7:
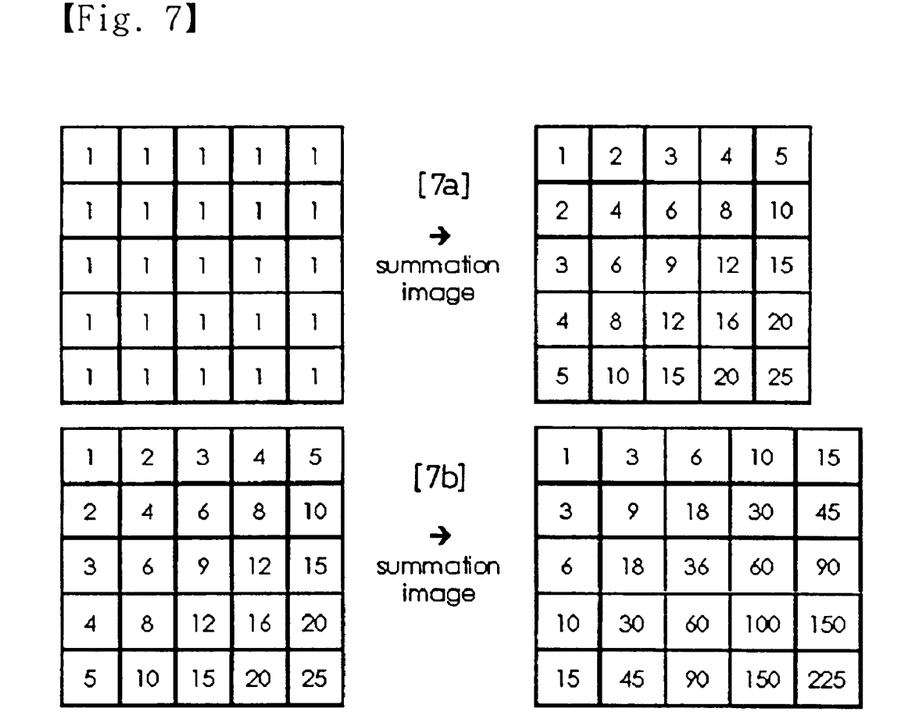
FIG. 7 is a diagram illustrating an example of calculation of accumulative image data in the present invention.

An example of the accumulative image data is shown in FIG. 7.

Here, the size of a memory for storing the accumulative image data must be large enough to store the summnation of the maximum data. For example, for 512×512 data, the memory must store the maximum value of 255×512×512 requiring 26 bits per pixel and 1 MByte for storage of the entire data.

When the mask size is 5×5, the image values of the target pixel and its surrounding pixels are I(1,1) to I(5,5), the step number of the mask is 5 and the values of the mask are M(1,1) to M(5,5), the image value of the target pixel becomes I(3,3). The result is calculated by:

$$\sum_{i=1}^{5}\sum_{j=1}^{5} I(i,j) \times M(i,j)$$

Here, the mask can be simplified into three steps and has three values. That is, the mask values are:

M(3,3)=V(1) at the center;

M(2,2), M(2,3), M(2,4), M(3,2), M(3,4) M(4,2), M(4,3), M(4,4)=V(2) in the next step; and all V(3) in the last step.

Therefore, the above expression becomes:

I(3,3)×V(1)+[I(2,2), I(2,3), I(2,4), I(3,2), I(3,4), I(4,2), I(4,3), I(4,4)]×V(2)+[I(1,1)+I(1,2)+I(1,3), I(1,4)+I(1,5)+I(2,1)+I(2,5)+I(3,1)+I(3,5)+I(4,1)+I(4,5)+I(5,1)+I(5,2)+I(5,3)+I(5,4)+I(5,5)]×V(3).

This can be rewritten as:

$$I(3,3) \times (V(1)-V(2)) + \sum_{i=2}^{4}\sum_{j=2}^{4} I(x,y) \times (V(1)-V(3)) + \sum_{i=1}^{5}\sum_{j=1}^{5} I(i,j) \times V(3)$$

It is therefore possible to dramatically reduce the revolution time by simply calculating the sum of the target areas from the above-stated accumulative image data and using a difference between the filter steps.

That is, the mask value is expressed into several mask values by steps and some of them are calculated in the next step, thereby reducing the number of calculations, as illustrated in FIG. 8.

Figure 8A:
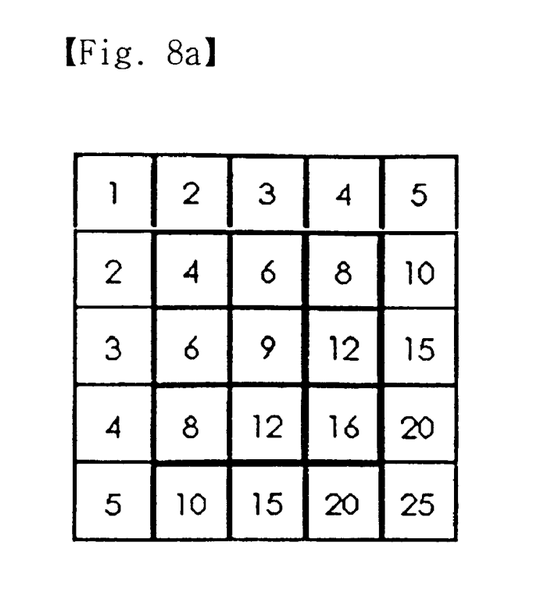
FIG. 8a illustrates target image data to be convolved.
Figure 8B:
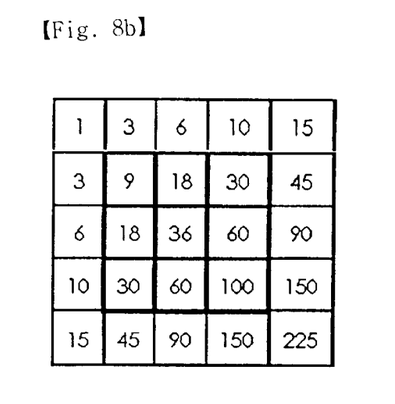
FIG. 8b illustrates accumulative image data for the left image.
Figure 8C:
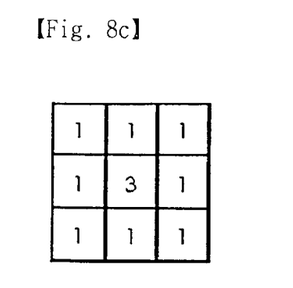
FIG. 8c illustrates a convolution mask value.
Figure 8D:
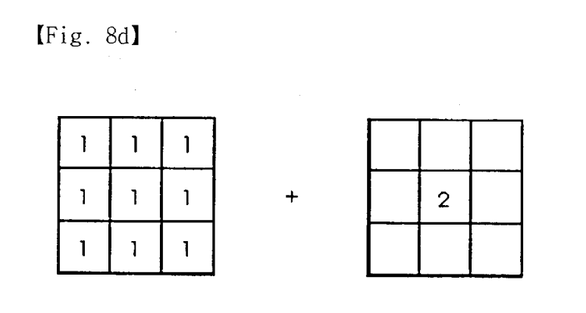
FIG. 8d is a diagram illustrating that the convolution mask value is divided into two steps.
Figure 8E:
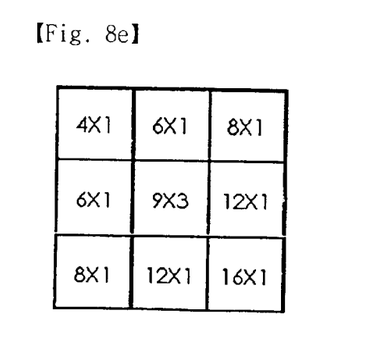
FIG. 8e is a diagram illustrating a convolution procedure according to the prior art.
Figure 8F:
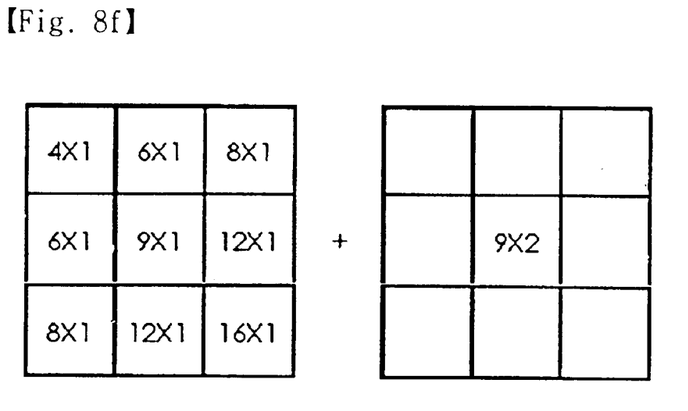
FIG. 8f illustrates another procedure performed by the respective steps according to the prior art.
Figure 8G:
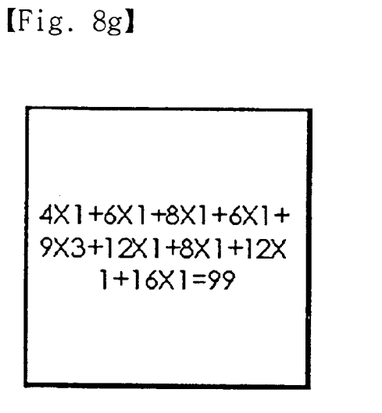
FIG. 8g is a diagram illustrating a procedure of summing the values obtained by multiplication in FIG. 8e in order to obtain the result value of the target pixel, according to the prior art.
Figure 8H:
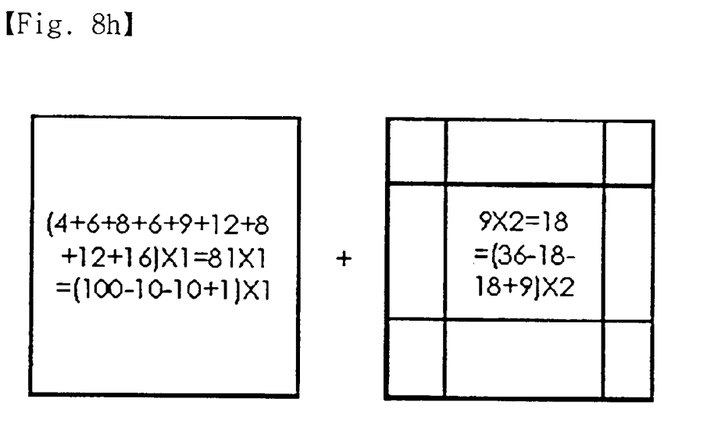
FIG. 8h is a diagram illustrating a procedure of summing the values obtained by multiplication in FIG. 8f to obtain the result value of the target pixel.

FIG. 8a shows target image data, FIG. 8b accumulative image data of FIG. 8a, and FIG. 8c the convolution mask value. FIG. 8d is a diagram illustrating that the convolution mask value is into two steps. FIG. 8e illustrates a conventional convolution procedure and FIG. 8f illustrates another conventional procedure performed by the respective steps. FIG. 8g is a diagram illustrating a related art procedure of summing the values obtained by multiplication in FIG. 8e in order to obtain the result value of the target pixel. FIG. 8h is a diagram illustrating a related art procedure of summing the values obtained by multiplication in FIG. 8f to obtain the result value of the target pixel.

For two-dimensional data, when the size of target image is M×N and the size of filter is m×n, the related art filter requires M×N×(m×n multiplications and m×n summations) calculations, since it needs a number of multiplications and summations as many as the size of the filter mask per pixel.

The present invention filter requires three summations and one multiplications per pixel and there exist M×N×2 pixels. In a case where the step number of the mask is maximum, the novel filter requires M×N×[two summations+(three summations and one multiplication)×the step number of the mask) calculations in total. If the mask size is 13×13, the number of calculations can be decreased to 1/24 to for multiplications and 1/7 for summations, thereby reducing convolution speed dramatically. This enables the present invention to be used in the field of applications requiring high speed processing and makes it possible to use a large-sized filter to enhance accuracy of the result.

Figure 9:
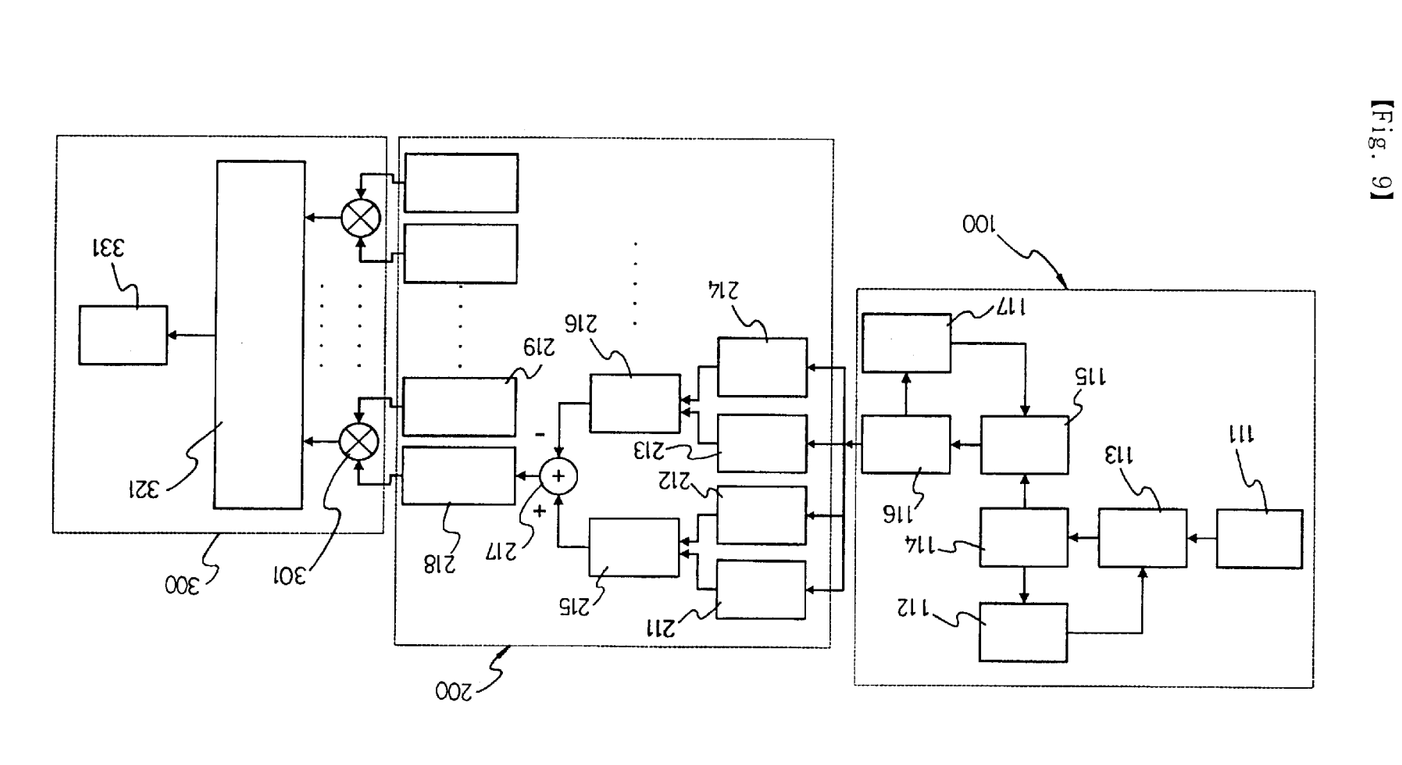
FIG. 9 is a block diagram of a high convolution apparatus in accordance with the present invention.

FIG. 9 is a block diagram of a high convolution apparatus in accordance with an embodiment of the present invention.

Here, the reference numeral 100 indicates a means for generating accumulative image data by converting an input image of a camera to digital image data, adding the converted image data to image summation data from the origin of the present horizontal line to the previous pixel and adding the result value of the previous adding step to the pixel values in the rectangular a area formed by the origin and pixels on a line previous to the present pixel.

The accumulative image data generator 100 includes: an image data output 111 for converting the input image of the camera to digital values and outputting the digital values to image data f(x,y); a previous image value memory 112 for temporarily storing the summation on the horizontal line until the previous pixel calculated in the previous step and stored in a buffer 114 in order to calculate the summation on the horizontal line until the present pixel; a first adder 113 for adding the summation of the image data from the origin on the present horizontal line to the previous pixel obtained from the previous image value memory 112 to image data output from the image data output 111; a buffer 114 for storing the summation on the horizontal line until the present pixel; a previous area data memory 117 for temporarily storing the accumulated image values in the rectangular formed by pixels on the previous line and the origin, obtained from an accumulative image memory 116, in order to calculate an accumulated value of the image values in the rectangular formed by the present pixels and the origin: a second adder 115 for adding the image data output from the buffer 114 to the image data of the pixel values in the rectangular formed by the pixels on the previous line and the origin, output from the previous area data storage 117; and an accumulative image memory 116 for storing the accumulative image data.

The reference numeral 200 represents a corresponding area data acquiring means for extracting a predetermined number of partial area data $F_{xy}(x2,y2)$, $F_{xy}(x1,y2)$ and $F_{xy}(x2,y1)$ from the accumulated image $F_{xy}(x,y)$ generated at the accumulative image data generator 100, selectively adding and subtracting the extracted partial area data to obtain image summation data of the corresponding area $F_{xy}(x1,y1,x2,y2)$, and outputting a mask step value corresponding to the corresponding area $F_{xy}(x1,y1,x2,y2)$. The corresponding area data calculator 200 includes: first to fourth partial area extractors 211–214 for extracting four partial area data $F_{xy}(x2,y2)$, $F_{xy}(x1,y1)$, $F_{xy}(x1,y2)$ and $F_{xy}(x2,y1)$ from the accumulated image data $F_{xy}(x,y)$ generated at the accumulative image data generator in order to calculate the summation of parts corresponding to areas of the respective mask steps in a certain image; third and fourth adders 215 and 216 for combining two of the four extracted partial area data $F_{xy}(x2,y2)$, $F_{xy}(x1,y1)$ $F_{xy}(x1,y2)$ and $F_{xy}(x2,y1)$; a subtractor 217 for subtracting the output data of the fourth adder 216 from the output data of the third adder 215; a corresponding area image summation data output 218 for outputting the output of the subtractor 217 as corresponding area image summation data $F_{xy}(x1,y1,x2,y2)$; and a corresponding mask value output 219 for outputting a mask value corresponding to the area $F_{xy}(x1,y1,x2,y2)$.

The reference numeral 300 represents a means for outputting a pixel convolution value by multiplying the image data in the corresponding area $F_{xy}(x1,y1,x2,y2)$ obtained at the corresponding area data calculator 200 by the corresponding mask step value and summing the result values of the multiplication for the respective corresponding areas. The pixel convolution value output 300 includes: a plurality of multipliers 301 for multiplying a plurality of corresponding area image data $F_{xy}(x1,y1,x2,y2), \ldots, F_{xy}(xm,ym,xn,yn)$ obtained at the corresponding area data calculator by a plurality of mask step values $V(1), \ldots V(n)$ corresponding, to the plural areas; an adder 321 for summing the output data of the plural multipliers 301; and a pixel convolution output 331 for outputting the output data of the adder 321 as a pixel convolution value.

Now, reference will be made as to an operation of the present invention high speed convolution apparatus as constructed above.

First, the image data output 111 in the accumulative image data generator 100 converts the input image of a camera to digital values to output image data F(x,y). The first adder 113 adds the image data summation from the origin on the present horizontal line to the previous pixel, obtained at the previous image value memory 112, to the image data output from the image data output 111. The result is temporarily stored in the buffer. The second adder 115 adds the image data output from the buffer 114 to the image data of the pixel values in a rectangular area formed by the origin and the pixels on the previous line output from the previous area data memory 117. The result is stored in the accumulative image memory 116, thereby generating accumulative image data.

The accumulative image data thus generated are input to the corresponding area data calculator 200. The first to fourth partial area extractors 211–214 in the corresponding area data calculator 200 extract four partial area data from the accumulative image data generated at the accumulative image data generator 100 in order to calculate the summation of the parts corresponding to the respective mask step areas in the image. The third and fourth adders 215 and 216 add the four partial area data by two partial areas. The subtractor 217 subtracts the output data of the fourth adder 216 from the output data of the third adder 215. The output of the subtractor 217 is output as image summation data in the corresponding area via the first corresponding area image summation data output 218. Upon calculation of the corresponding area image data, the corresponding area image data calculator 200 also outputs the mask step value corresponding to the area via the corresponding mask step value output 219.

The corresponding mask step value is multiplied at the multiplier 301 in the pixel convolution value output 300 and the results are added to the outputs of the other multipliers at the adder 321. The result is output as a pixel convolution value via the convolution value output 331.

Although the convolution is calculated for one pixel in the above description, the above-stated convolution procedure is actually repeated to obtain the convolution values of the entire image.

For reference, the accumulative image data generation procedure and the image acquisition may be simultaneously performed in construction of hardware. After calculation of the accumulative image above the mask size, the corresponding area image data acquisition procedure may be performed separately from the pixel convolution output procedure.

Figure 10D:
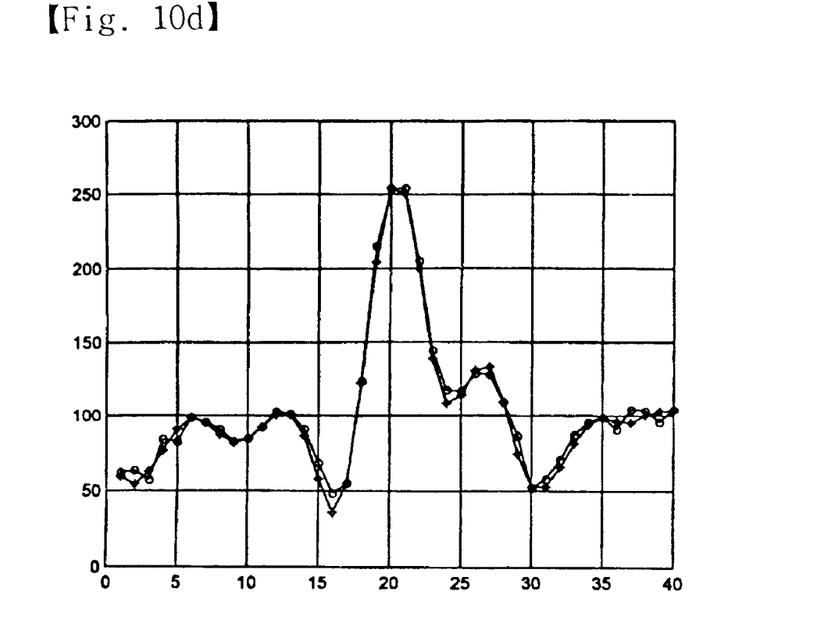
FIG. 10d is a diagram comparing the convolution values shown in FIGS. 10b and 10c.
Figure 11:
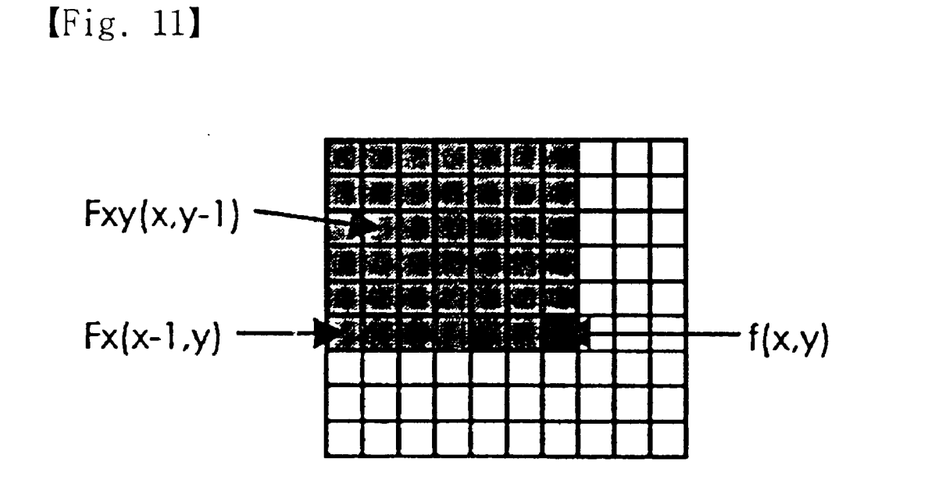
FIG. 11 shows a target image area to be convolved in the present invention.

FIG. 10 is a diagram illustrating an example of Laplacian of Gaussian. FIG. 10a shows the original image value, FIG. 10b a convolution value obtained by the related art convolution method. FIG. 10c a convolution value obtained by the present invention convolution method. FIG. 10d is a diagram comparing the convolution values shown in FIGS. 10b and 10c.

As illustrated, the image has a bright spot with average value of about 131 and a difference from the center being about 4. The image obtained in the present invention has no particular differently from the existing algorithm.

As described above, the present invention has an advantage in that high speed convolution can be processed irrespective of the mask size through a novel image file structure and linearity of convolution.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An apparatus for high speed convolution comprising:

an accumulative image data generating means for converting an input image of a camera to digital image data, adding the converted image data to image summation data from an origin on a present horizontal line to a previous pixel, and adding the result value to a pixel value in a rectangular area formed by an origin and pixels on the line previous to a present pixel, to generate an accumulative image data;

a corresponding area data calculating means for extracting a predetermined number of partial area data from the accumulative image data generated from the accumulative image data generating means, selectively adding and subtracting the extracted partial area data to obtain image summation data of the corresponding area, and outputting a mask step value corresponding to said corresponding area; and a pixel convolution value outputting means for multiplying the corresponding area image data obtained from the corresponding area data calculating means by the corresponding mask step value and summing the multiplication results to output a pixel convolution value.

2. The apparatus as claimed in claim 1, wherein the accumulative image data generating means comprises:

an image data output for converting the input image of the camera to digital values and outputting image data f(x,y);

a previous image value memory for temporarily storing a horizontal line summation value until the previous pixel calculated in the previous step and stored in a buffer, in order to calculate a horizontal line summation value until the present pixel;

a first adder for adding the summation value of image data from an origin on the previous horizontal line to the previous pixel obtained from the previous image value memory to image data output from the image data output;

a buffer for storing the horizontal line summation value until the present pixel;

a previous area data memory for temporarily storing an accumulative image value in a rectangular area formed by pixels on the previous line and the origin, obtained from the accumulative image memory, in order to calculate an accumulative image value in a rectangular area formed by the present pixel and the origin;

a second adder for adding the image data output from the buffer to image data of pixel values in the rectangular area formed by the pixels on the previous line and the origin.

3. The apparatus as claimed in claim 1, wherein the corresponding area data calculating means comprises:

first to fourth partial area extractors for extracting four partial area data $F_{xy}(x2,y2)$. $F_{xy}(x1,y1)$, $F_{xy}(X1,y2)$ and $F_{xy}(x2,y1)$ from the accumulative image data $F_{xy}(x,y)$ generated from the accumulative image data generating means, in order to calculate the summation of parts corresponding to areas of each mask step in an image;

third and fourth adders for combining two of the four extracted partial area data $F_{xy}(x2,y2)$, $F_{xy}(x1,y1)$, $F_{xy}(x1,y2)$ and $F_{xy}(x2,y1)$;

a subtractor for subtracting output data of the fourth adder from output data of the third adder; and a corresponding area image summation data output for outputting the output of the subtractor as corresponding area image summation data $F_{xy}(x1,y1,x2,y2)$; and a corresponding mask value output for outputting a mask value corresponding to the area $F_{xy}(x1,y1,x2,y2)$.

4. The apparatus as claimed in claim 1, wherein the pixel convolution value Outputting means comprises:

a plurality of multipliers for multiplying a plurality of corresponding area image data $F_{xy}(x1,y1,x2,y2)$,..., $F_{xy}(xm,ym,xn,yn)$ obtained at the corresponding area data calculating means by a plurality of mask step values $V(l), \ldots, V(n)$ corresponding to the plural areas;

an adder for summing the output data of the plural multipliers; and a pixel convolution output for outputting the output data of the adder as a pixel convolution value.

5. A method for high speed convolution comprising the steps of:

converting an input image of a camera to digital image data;

adding the converted image data to image summation data from an origin of a present horizontal line to a previous pixel and adding the resulting value to a pixel value in a rectangular area formed by an origin and pixels on the line previous to a present pixel, to generate an accumulative image data;

extracting a predetermined number of partial area data from the accumulative image data and selectively adding and subtracting the extracted partial area data to obtain image summation data of the corresponding area, and outputting a mask step value corresponding to said corresponding area; and multiplying the corresponding area image data by the corresponding mask step value and summing the multiplication results to output a pixel convolution value.

* * * * *